US009959434B1

(12) United States Patent
Ng et al.

(10) Patent No.: US 9,959,434 B1
(45) Date of Patent: May 1, 2018

(54) BI-DIRECTIONAL COMMUNICATION SYSTEM FOR LOGISTIC TRACKING

(71) Applicant: Ospicon Systems Pte Ltd, Singapore (SG)

(72) Inventors: Seng Tat Ng, Singapore (SG); Hwee Siong Chong, Singapore (SG); Xin Jiang, Singapore (SG); Sheng Su, Guangdong (CN)

(73) Assignee: OSPICON SYSTEMS PTE LTD, Singapore (SG)

( * ) Notice: Subject to any disclaimer, the term of this patent is extended or adjusted under 35 U.S.C. 154(b) by 0 days. days.

(21) Appl. No.: 15/289,141

(22) Filed: Oct. 8, 2016

(51) Int. Cl.
*G06K 7/10* (2006.01)

(52) U.S. Cl.
CPC ..... *G06K 7/10207* (2013.01); *G06K 7/10366* (2013.01)

(58) Field of Classification Search
CPC .......... G06K 7/10366; G06K 7/10009; G06K 7/10316; G06K 19/0723; G06K 7/10356; G06K 19/0717; G06K 7/0008
USPC ....................................... 340/10.1
See application file for complete search history.

(56) References Cited

U.S. PATENT DOCUMENTS

| 7,142,121 | B2 | 11/2006 | Chan et al. | |
|---|---|---|---|---|
| 8,027,282 | B2 * | 9/2011 | Boehnke | G08C 17/02 340/10.3 |
| 8,275,404 | B2 * | 9/2012 | Berger | G06Q 10/06 455/404.1 |
| 8,300,551 | B2 * | 10/2012 | Koop | H04L 45/122 370/229 |
| 2002/0055333 | A1 | 5/2002 | Davies et al. | |
| 2003/0220114 | A1 | 11/2003 | Langensteiner et al. | |
| 2013/0065584 | A1 | 3/2013 | Lyon et al. | |
| 2015/0358759 | A1 | 12/2015 | Jakusovszky et al. | |
| 2016/0029148 | A1 | 1/2016 | Jackson et al. | |
| 2016/0241559 | A1 | 8/2016 | Trani et al. | |
| 2016/0275556 | A1 | 9/2016 | Shanmugam et al. | |

FOREIGN PATENT DOCUMENTS

| CN | 101789933 B | 9/2013 |
|---|---|---|
| CN | 103856249 A | 6/2014 |
| CN | 103856630 A | 6/2014 |

(Continued)

OTHER PUBLICATIONS

International Search Report of PCT Patent Application No. PCT/SG2016/050497 dated Jan. 20, 2017.

*Primary Examiner* — Mark Blouin

(57) ABSTRACT

The present invention provides a method of operating a bi-directional communication system between a plurality of communication devices, which comprises at least one communication controller and a plurality of nodes including a first node. The method includes periodically broadcasting a beacon signal from said communication controller at a broadcast interval via a channel of a first host. The beacon signal contains a first address of the communication controller. The method further includes periodically scanning the beacon signal on the first host by the first node. Upon detecting of the beacon signal by the first node, the first node transmits an identification payload to the communication controller. Upon receipt of the identification payload by the communication controller, an acknowledgement signal is transmitted to the first node.

17 Claims, 10 Drawing Sheets

(56) References Cited

FOREIGN PATENT DOCUMENTS

| CN | 104077673 A | 10/2014 |
|---|---|---|
| CN | 104768125 A | 7/2015 |
| CN | 105320981 A | 2/2016 |

* cited by examiner

BI-DIRECTIONAL COMMUNICATION SYSTEM FOR LOGISTIC TRACKING

FIELD OF THE INVENTION

The present invention relates generally to methods of logistic management using bi-directional wireless communication system, and more particularly, to methods of monitoring the location of inventories based on active RFID technology with reduced power consumption in RFID tags and handshaking communication protocol.

BACKGROUND TO THE INVENTION

Traditional logistics tracking systems based on RFID technology may be implemented by either active RFID tags or passive RFID tags. Known active RFID tags possess their own power source and transmitter enabling the tag to broadcast its signal. Performance capabilities include longer read ranges and greater memory capacities when compared to passive RFID tags. However, in order to achieve a significant read range and larger memory, these performance capabilities generate a greater demand for power. Typically, active RFID tags are powered by a long life battery that will last for a few years, but will eventually require replacing.

Two different types of active RFID tags are well known—transponders and beacons. An active RFID transponder only communicates when in the immediate presence of a reader's interrogating signal, thus conserving battery life when the tag is out of range of the reader. Active RFID transponders are commonly used in secure access control and in toll booth payment systems.

Active RFID tags purposed as beacons periodically transmits their identifying information at user defined intervals and RFID reader antennas will read and determine the tag's location with the help of back-end software. This type of active RFID tag is frequently used in real-time location systems (RTLS) commonly found in outdoor shipping yards and throughout supply chains. Some active RFID tags have a read range capable of reaching 100 meters in ideal outdoor environments.

All these additional features translate to increased costs for the customer. The prices of active RFID tags depend on the tag's ability to withstand harsh conditions and other key functional features of the tag.

Bluetooth Low Energy (BLE) technology is one of the known wireless systems suitable for active RFID applications. iBeacon is a protocol developed by Apple based on BLE and various vendors have since made iBeacon-compatible hardware transmitters—typically called beacons—a class of BLE devices that broadcast their identifiers to nearby portable electronic devices. The iBeacon technology enables smartphones, tablets and other devices to perform actions when in close proximity to an iBeacon tag. Upon detecting the iBeacon tag, the mobile phone activates relevant mobile app based on its contextual search utilizing received iBeacon information and location information. In this example, different iBeacon tags can activate different mobile apps for providing promotional or campaign information to the mobile phone user.

iBeacon uses BLE proximity sensing to broadcast a universally unique identifier which will be picked up by a reader with compatible app or operating system. The identifier and data sent with it can be used to determine the device's physical location, track customers, or trigger a location-based action on the device such as a check-in on social media app or a push notification.

However, iBeacon utilizing BLE does have its obstacles to overcome if it is to be used for active RFID application. The current limitations of iBeacon approach for active RFID applications are:

1. The BLE standard offers 40 frequency channels. Among which only three broadcast channels (37, 38, and 39) can be used for iBeacon applications. This works out to a maximum possible timeslot availability of 400 (based on iBeacon broadcast interval of 100 ms and advertising packet duration of approximately 0.75 msec, i.e. (100/0.75)×3 broadcast channels) assuming no collision. For active RFID application with potentially a few thousands active RFID tags to be read by the tag reader, the iBeacon approach for BLE is not workable as the probability of collision increases with increased number of iBeacon tags.

2. The iBeacon approach broadcasts continuously whether the tag reader is present or not. This is a waste of battery life and will increase the rate of active RFID tag replacement cycle which will in turn increase the cost of use. Moreover, the broadcast approach prevents application of RFID on board aeroplanes under FAA rules which restricts equipment RF transmission on aeroplanes in flight.

3. iBeacon approach does not have reliable data handshake between tag and reader. The tag using iBeacon approach does not know whether the tag reader has successfully acquired its data as there is no acknowledgment sent by the reader to the tag. Hence, the tag has to periodically broadcast its data continuously.

4. iBeacon approach is not data secure as any BLE device can sniff and listen to the data broadcast by the tag.

There is therefore a need in the art to utilize BLE technology in an enhanced manner for active RFID application so as to gain from its low cost and low power consumption benefits and yet able to overcome the limitation of the traditional iBeacon approach.

In addition, it would be preferable if the tag reader is able to read unlimited number of tags within its range. It would also be preferable if the tag reader can quickly and reliably retrieve the identification payload from the tag. It would further be preferable to extend the battery life of the tag to last for many years.

The present invention seeks to meet these needs.

SUMMARY OF THE INVENTION

The invention is characterized in what is said in the characterizing parts of the independent claims. The other embodiments of the invention are illustrated in independent claims.

According to a first aspect of the present invention, there is provided a method of operating a bi-directional communication system between a plurality of communication devices, which comprise at least one communication controller and a plurality of nodes including a first node. The method includes periodically broadcasting a beacon signal from said communication controller at a broadcast interval via a channel of a first host. The beacon signal contains a first address of the communication controller. The method further includes periodically scanning the beacon signal on the first host by the first node. Upon detecting of the beacon signal by the first node, the first node transmits an identification payload to the communication controller. Upon receipt of the identification payload by the communication controller, an acknowledgement signal is transmitted to the first node.

According to an advantageous embodiment, the acknowledgement signal further contains command instructing at least one subsequent action to be taken by the first node. Advantageously, in one subsequent action, the first node enters sleep mode for a specified duration. Advantageously, in one subsequent action, the first node is turned off.

According to an advantageous embodiment, the first node enters sleep mode for a first sleep duration after receiving the acknowledgement signal.

According to an advantageous embodiment, the first node enters sleep mode for a second sleep duration if the acknowledgement signal is not received for a predetermined period of time after transmitting the identification payload. Advantageously, the first sleep duration is longer than the second sleep duration.

According to an advantageous embodiment, the communication controller periodically broadcasts the beacon signal at multiple timeslots via alternative channels at different broadcast frequencies of the first host at the same broadcast interval.

According to an advantageous embodiment, the communication controller periodically broadcasts at least a further beacon signal containing at least one alternative address of the communication controller on a channel of a second host at the same broadcast interval. The respective broadcast frequencies of the same channel in different hosts are the same. According to a further advantageous embodiment, the communication controller contains at least 2 hosts, each host periodically broadcasts 3 beacon signals; the hosts contain different addresses of the communication controller; and the respective broadcast frequencies of the same channel in different hosts are the same.

According to an advantageous embodiment, the communication controller contains 8 hosts and the timeslots utilized by the communication controller for broadcasting the beacon signals at the 8 hosts amount to 30% or less of the broadcast interval for that broadcast channel.

According to an advantageous embodiment, a beacon signal within a broadcast period of the first host is followed immediately by a beacon signal of the same broadcast frequency within a broadcast period of the second host.

According to an advantageous embodiment, a beacon signal of the first host and a beacon signal of the same broadcast frequency of the second host are separated by a predetermined period of time.

According to an advantageous embodiment, the communication controller contains 16 hosts. The timeslots utilized by the communication controller for broadcasting the beacon signals at the 16 hosts amount to 60% or less of the broadcast interval for that broadcast channel.

According to an advantageous embodiment, the first node upon detecting of the beacon signal, only transmits the identification payload to the communication controller after checking that a beacon signal is present on the same channel at the next broadcast interval.

According to an advantageous embodiment, the first node connects immediately to the address of the communication controller as contained in the received beacon signal if the signal strength of the received beacon signal is low, or otherwise, connects to alternative addresses of the communication controller.

According to an advantageous embodiment, the communication controller is a tag reader and the plurality of nodes are tags. Advantageously, the two-way communication system is a Bluetooth low energy system. Advantageously, the beacon signal is configured as limited discoverable mode.

According to a second aspect of the present invention, there is provided a bi-directional communication system for logistic tracking. The communication system includes at least one communication controller and a plurality of nodes, including a first node. The communication controller periodically broadcasts a beacon signal from the communication controller at a broadcast interval via a channel of a first host. The beacon signal contains a first address of the communication controller. The first node periodically scans the beacon signal on the first host. The first node transmits an identification payload from the first node to the communication controller upon detecting of the beacon signal. The communication controller transmits an acknowledgement signal to the first node upon receipt of the identification payload.

According to a third aspect of the present invention, there is provided a bi-directional communication system for logistic tracking, including at least one communication controller; and a plurality of nodes associated with inventories and including a first node; wherein the communication controller periodically broadcasts a beacon signal from the communication controller at a broadcast interval via a channel of the first host, the beacon signal containing a first address of the communication controller; wherein the first node periodically scans the beacon signal on the first host; wherein the first node transmits an identification payload from the first node to the communication controller upon detecting of the beacon signal; and wherein the communication controller transmits an acknowledgement signal to the first node upon receipt of the identification payload.

Advantageously, the bi-directional communication system for logistic tracking further comprises a local server for collecting and recording the presence information of the plurality of nodes from the communication controller.

Advantageously, the bi-directional communication system for logistic tracking further comprises a remote server for collecting and recording the presence information of the plurality of nodes from the communication controller.

According to a fourth aspect of the present invention, there is provided a data network for logistic tracking comprising: at least one communication controller; and a plurality of nodes associated with inventories and including a first node; wherein the communication controller periodically broadcasts a beacon signal from the communication controller at a broadcast interval via a channel of a first host, the beacon signal containing a first address of the communication controller; wherein the first node periodically scans the beacon signal on the first host; wherein the first node transmits an identification payload from the first node to the communication controller upon detecting of the beacon signal; and wherein the communication controller transmits an acknowledgement signal to the first node upon receipt of the identification payload.

According to a fifth aspect of the present invention, there is provided a communication controller in a data network, the data network further including a plurality of nodes including a first node, the communication controller comprising: a processor; a memory providing code to the processor; and an interface controlled by the processor to: periodically broadcast a beacon signal at a broadcast interval via a first host, the beacon signal containing a first address of the communication controller; transmit an acknowledgement signal to the first node upon receipt of an identification payload from the first node.

According to a sixth aspect of the present invention, there is provided a first node in a data network, the data network further including a communication controller and a plurality of nodes including the first node, the first node comprising: a processor; a memory providing code to the processor; and an interface controlled by the processor to: periodically scan a beacon signal broadcast by the communication controller on a first host; and transmit an identification payload to the communication controller upon detecting of the beacon signal; wherein the first node enters sleep mode for a first sleep duration after receiving the acknowledgement signal; wherein the first node enters sleep mode for a second sleep duration if the acknowledgement signal is not received for a predetermined period of time after transmitting the identification payload.

BRIEF DESCRIPTION OF THE DRAWINGS

Specific embodiments of the invention will now be described in conjunction with the accompanying drawings, of which.

DETAILED DESCRIPTION OF SPECIFIC EMBODIMENTS

The present invention seeks to provide improved methods of logistic tracking. Whilst various embodiments of the invention are described below, the invention is not limited to these embodiments, and variations of these embodiments may well fall within the scope of the invention which is to be limited only by the appended claims.

The present invention can be applied in connection with any wireless communication systems, such as the Bluetooth low-energy (BLE), Bluetooth, ANT, ANT+, ZigBee, Wi-Fi, and the near-field communications (NFC) standard, etc.

According to an embodiment of the invention, the BLE technology is used in an enhanced manner for active RFID application so as to gain from its low cost and low power consumption benefits and yet able to overcome the limitation of the traditional iBeacon approach.

Standard Bluetooth Low Energy application for reading broadcast information utilizes iBeacon approach to broadcast information to smartphones, tablet and other devices. However, Bluetooth Low Energy standard only allows 3 broadcast channels. For active RFID application, iBeacon approach cannot be used as the maximum possible timeslot for broadcast is 400 (based on iBeacon broadcast interval of 100 msec and transmit duration of 0.75 msec of iBeacon packet). Although theoretically the maximum possible broadcast timeslot availability is 400, due to channel collision when there a significant number of tags (e.g. Thousands) within range, the success rate of broadcast beacon that are not corrupted due to collision can be greatly reduced. Besides this, iBeacon approach is unreliable as there is no acknowledgement of data receipt. Furthermore, as iBeacon method continuously broadcast, the battery life of the tag cannot be optimized and the collision problem will persists as long as large number of tags are grouped together. Moreover, the broadcast approach prevents application of RFID on board aeroplanes under FAA rules which restricts equipment RF transmission on aeroplanes in flight.

Figure 1:
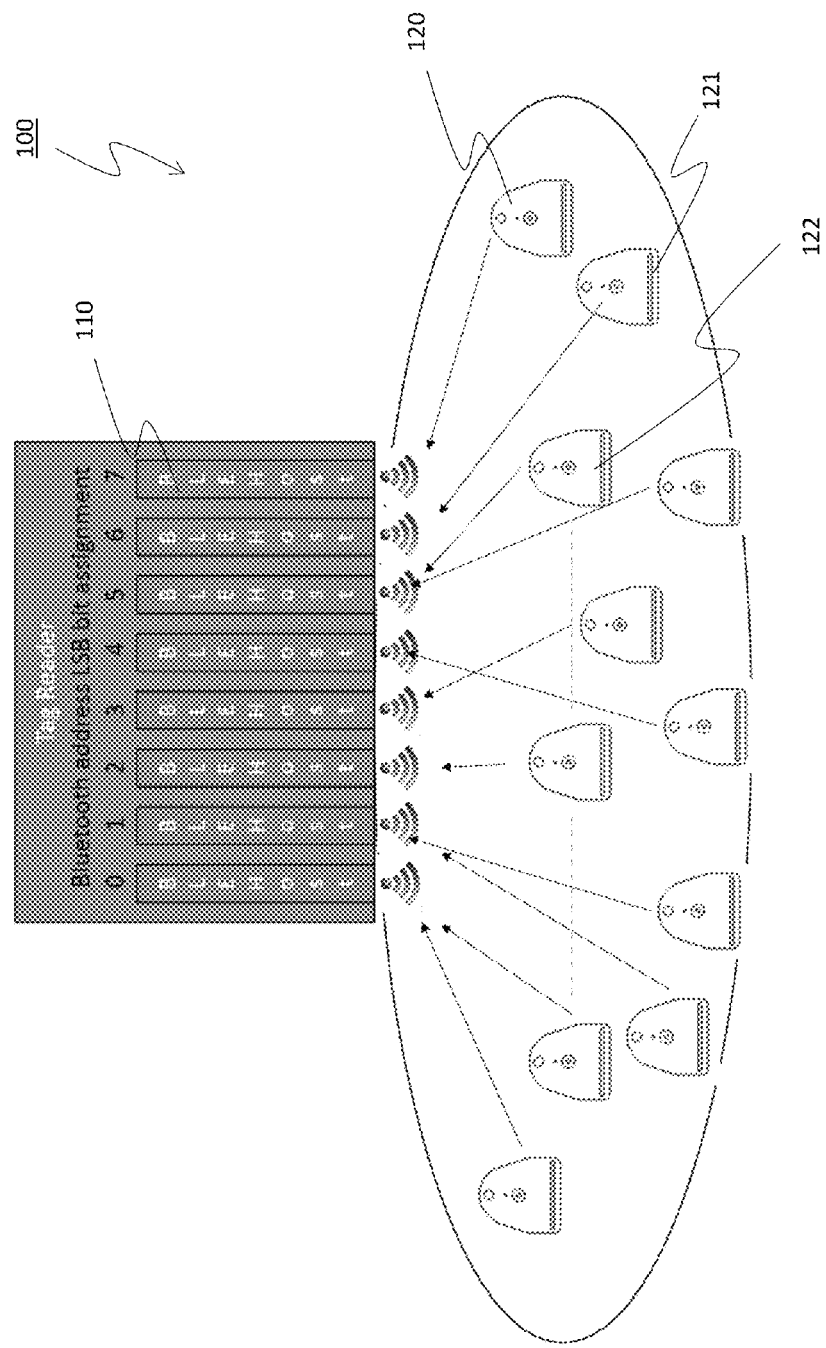
FIG. 1 is a diagram of a system in accordance with an embodiment of the invention.

FIG. 1 illustrates a logistic tracking system 100 in accordance with an embodiment of the invention. The logistic tracking system 100 includes a communication controller, such as a tag reader 110, and a plurality of nodes, such as tags 120, 121, 122, etc. The tags 120, 121, and 122 are self-powered and periodically wake up from sleep mode to check the presence of the tag reader 110 in order to establish wireless communication and transmit identification data to the tag reader 110. The tag reader 100 may record identification data received from the tags 120, 121, and 122 and send the data over a network (not shown) to other readers or central monitoring stations. The data may be used to monitor the location of the objects associated with the tags 120, 121, and 122. The data may also be used to generate messages indicating location information of the objects. The data transmission between the tags 120, 121, 122 and the tag reader 110 is carried out in a reliable and secure manner. According to an embodiment of the invention, the BLE topology is utilized to support reading a large number of tags in a confined space of typical radius of up to 50 meters of the tag reader 110.

Figure 2:
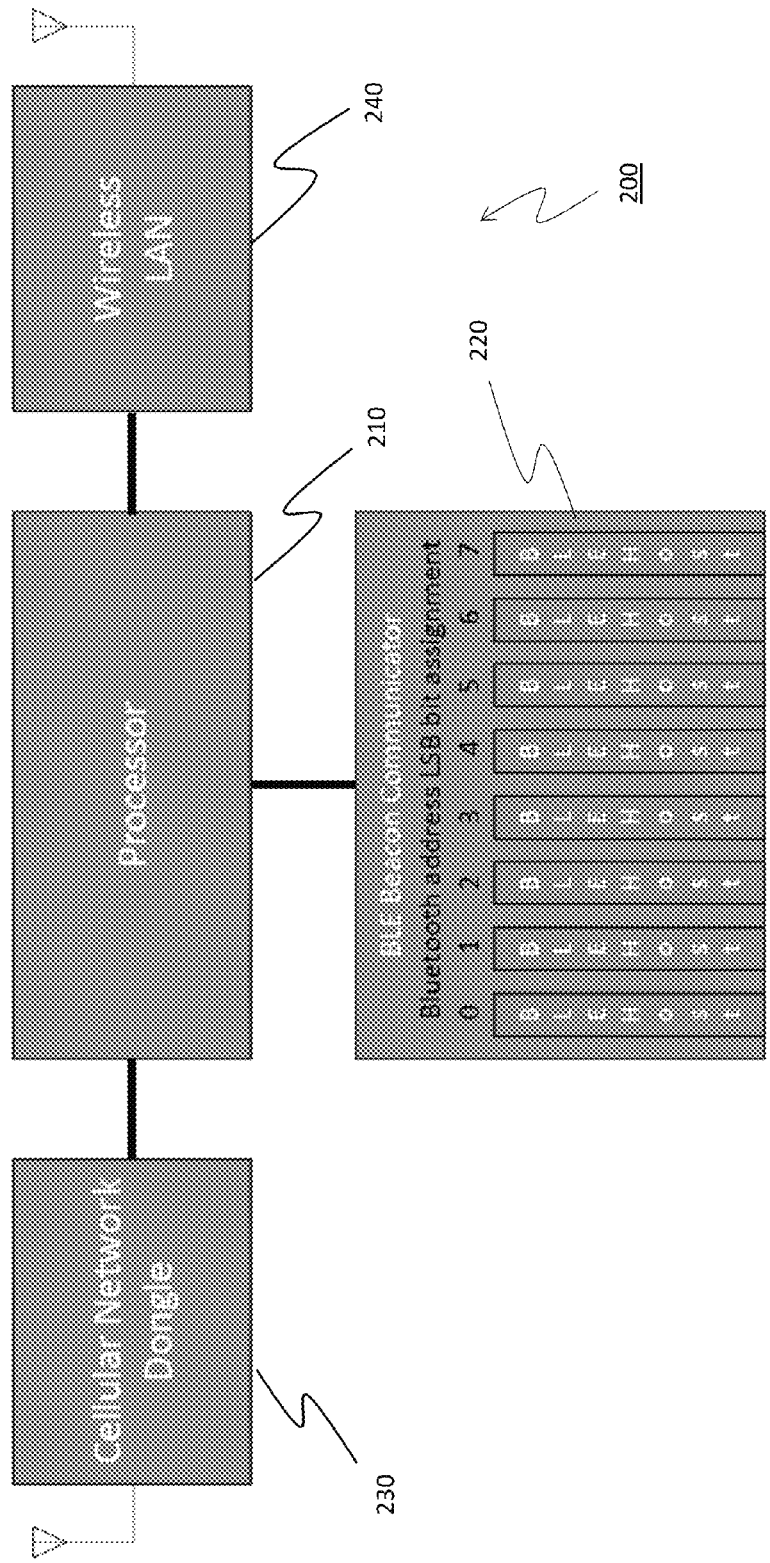
FIG. 2 is a block diagram of a tag reader in accordance with an embodiment of the invention.

FIG. 2 illustrates the hardware block diagram of a tag reader 200 in accordance with an embodiment of the invention. The tag reader 200 comprises a processor 210 with an operating system and control software that communicates with a BLE beacon communicator 220 for establishing wireless communication with the tags (not shown), a cellular data dongle 230 and WLAN module 240.

Figure 3:
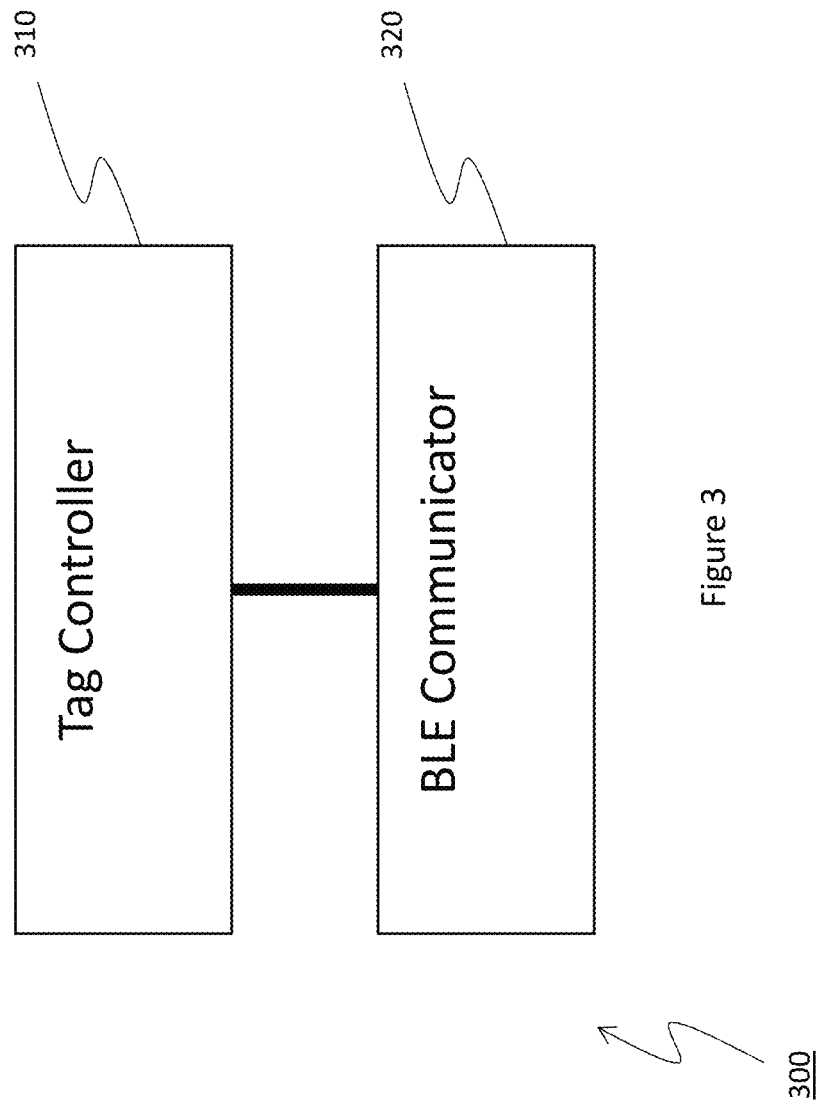
FIG. 3 is a block diagram of a tag in accordance with an embodiment of the invention.

FIG. 3 illustrates the hardware block diagram of a tag 300 in accordance with an embodiment of the invention. The tag 300 includes a controller 310 that communicates with a BLE communicator 320. Through the BLE communicator 320, the tag 300 is able to establish wireless communication with the tag reader (not shown) so as to scan for beacon signals, transmit identification signal, receive acknowledgement signal and commands, etc. The controller 310 controls the operation of the tag 300 under different modes, such as the scan mode, connection mode and sleep mode. The function of the controller 310 can be implemented by hardware logic or by software executed by a processor.

Figure 4:
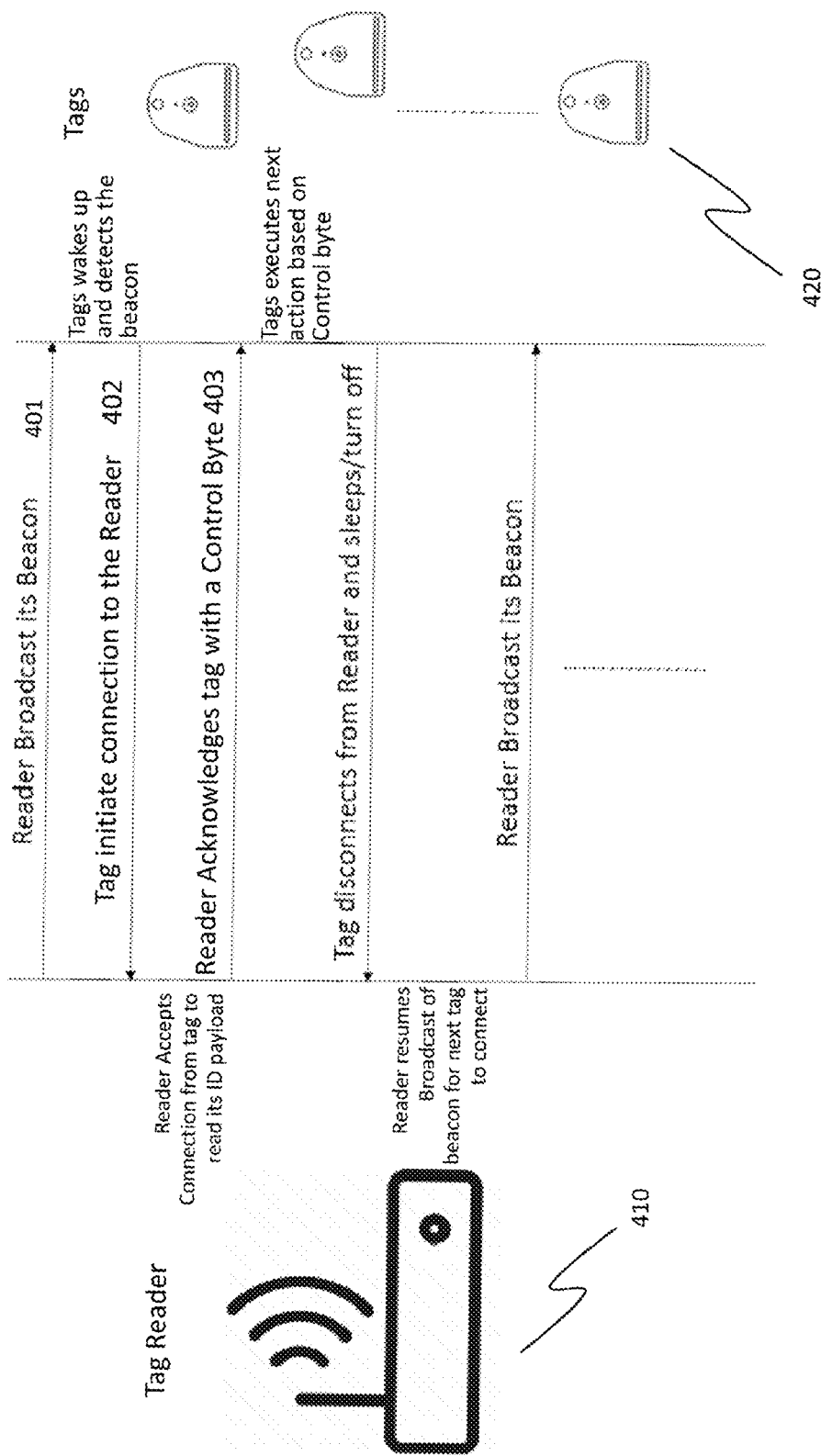
FIG. 4 is a message flow sequence between a tag reader and a tag, according to an embodiment of the invention.

FIG. 4 shows a message flow sequence between a tag reader 410 and a tag 420 according to an embodiment of the invention. The tag reader 410 becomes the broadcaster of the beacon signal 401 which is transmitted on the advertising channels of a BLE host. As defined by the BLE standard, one BLE host contains three advertising channels, i.e.: channels 37, 38 and 39. If the broadcast interval is set as 20 ms, a maximum of three beacon signals can be transmitted every 20 ms which means a total of 150 beacons are broadcast every second per BLE host. The advertising protocol and advertising state timing are explained in more detail in Bluetooth specification v4.0 Volume 6 section 4.4.2.0n the other side, the tag 420 wakes up periodically at a scan interval to check for the presence of the beacon signal 401 from the tag reader 410. The scan interval (wake up time) depends on how fast the tag 420 has to be detected by the tag reader 410 and battery life expectation of the tag 420.

Once the beacon signal is detected by the tag 420, the tag 420 will initiate a connection to the tag reader 410 and send its identification payload 402 to the tag reader 410. To acknowledge the receipt of identification payload by the tag reader 410, an acknowledgement packet 403 is transmitted from the tag reader 410 to the originating tag 420 to confirm receipt. The channel configuration for the advertising process and connection setup process will be further described below.

According to an embodiment of the invention, the BLE channels 37/38/39 are assigned for both broadcast and connection setup purpose. Specifically, the BLE Limited Discoverable Mode is used by setting the "limited flag" on the connectable packets, so that channels 37/38/39 can operate at both the broadcast phase and the connection setup phase. The Limited Discoverable Mode on GAP layer is discussed in more detail in Bluetooth specification v4.0 Volume 3 Section 9.2.3.

In the broadcast phase, channels 37/38/39 are configured as broadcast channels and only downlink communication is allowed. Tag reader 410 advertises connectable packets on channels 37/38/39. During connection setup phase, channels 37/38/39 are configured to support bi-directional communication.

On the tag side, limited discovery process is used to find any tag reader 410 nearby under Limited Discoverable Mode. When tag reader 410 is found, tag 420 will try to connect to it. The connection setup process is performed via the three advertising channels 37/38/39 according to the BLE standard. After the connection process is completed, tag reader 410 and tag 420 will exchange data (e.g.: identification payload) on one of the 37 data channels (0-36) available as defined by the BLE standard. The connection setup process is explained in more detail in Bluetooth specification v4.0 Volume 6 section 4.4.4 (Initiating state & connection state).

After connection setup, all data transfer (e.g.: identification payload) on the data channels (0-36) will be built based on GATT profile over L2CAP link. The link may be encrypted to provide security. The communication protocol after connection setup is explained in more detail in Bluetooth specification v4.0 Volume 3 Part F on Attribute Protocol (ATT) and Part G on Generic Attribute Profile (GATT).

According to an alternative embodiment of the invention, the acknowledgement packet 403 may further contain a control byte which allows the tag reader to instruct the subsequent actions to be executed by the tag 420. For example, in order to optimize the tag power consumption, the control byte may specify a predetermined sleep duration before the tag 420 wakes up to detect for broadcast beacons again. In another example, the control byte may specify the tag to power off.

Figure 5A:
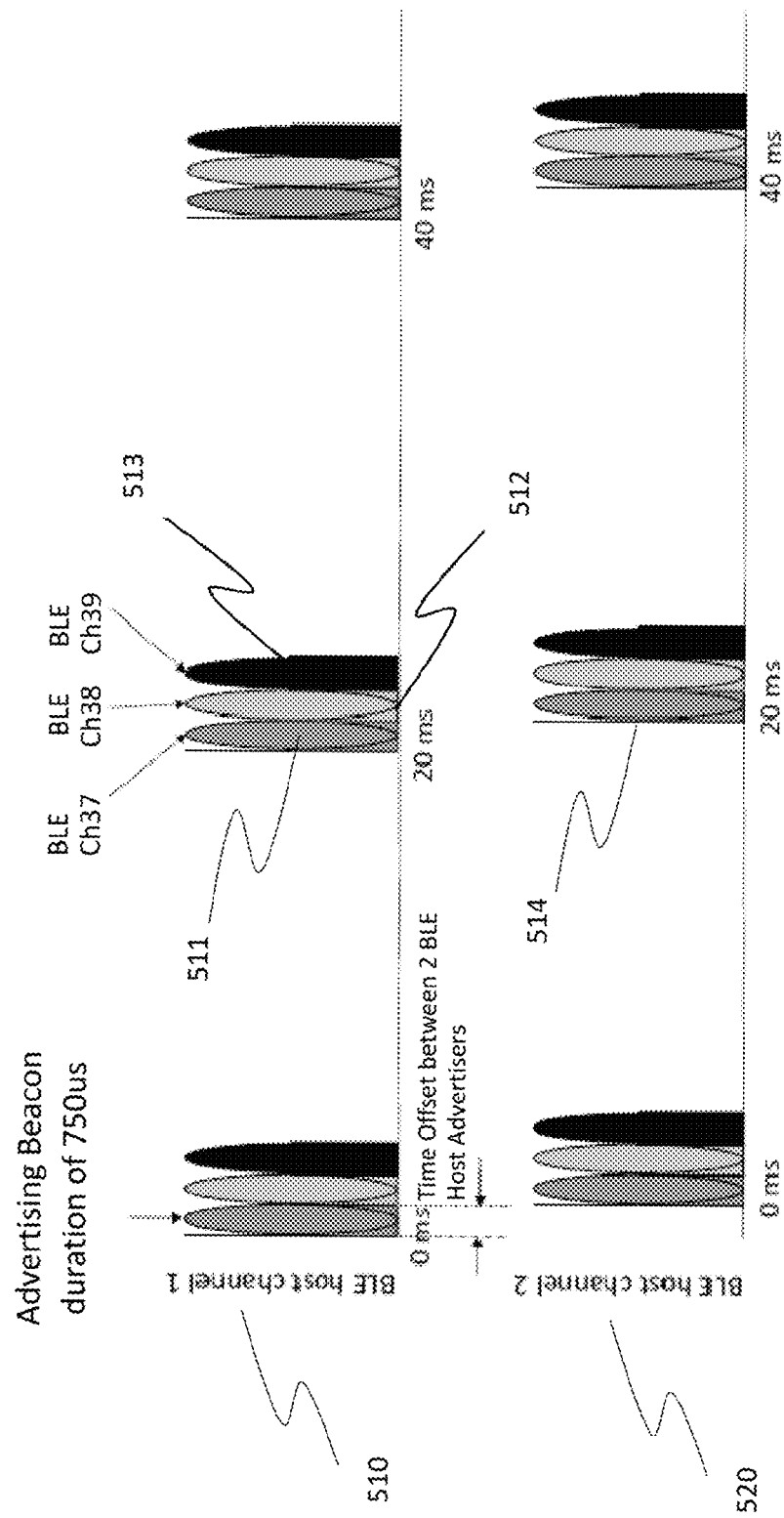
FIG. 5a is a signal diagram illustrating the broadcast beacon duration and interval of a tag reader with multiple hosts, according to an embodiment of the invention.

According to an embodiment of the invention, the tag reader may be powered from the AC mains, in which case power consumption consideration is less important. FIG. 5a is a signal diagram illustrating the broadcast beacon duration and interval of a tag reader with multiple hosts 510, 520, etc., according to an embodiment of the invention. The BLE beacon communicator in the tag reader consists of a bank of 8 independent BLE host modules with 3 LSB bits of its Bluetooth address fixed from 0-7 (see FIGS. 1 and 2). Each BLE host module's channel (e.g.: 510) will independently broadcast a unique Beacon ID (e.g.: 511) at the shortest interval of 20 ms as defined by BLE standard. The same advertising channels of different hosts have the same frequency, e.g.: channel 37 of the first host 510 has the same frequency as channel 37 of the second host 520. Beacons of different hosts on the same advertising channel are preferably non-overlapping in the time domain to avoid interference. Based on 3 beacons (511, 512, 513) every 20 ms per BLE host, there are 150 beacons broadcast per BLE host per second. With 8 BLE hosts, there are 1,200 beacons broadcast per second by the tag reader. The chance for the tag to successfully connect to one of the 8 BLE host channels available on the tag reader can therefore be optimized. The ratio of the number of tag readers with 8 independent BLE hosts to the number of tags to be scanned depends on the detection timing required for the maximum number of tags presence around the tag reader.

According to an embodiment of the invention, the beacon packet duration is approximately 750 μs and the broadcast interval is set as 20 ms, there is a maximum of 20/0.75×3 broadcast channels=80 BLE broadcast timeslots that can be utilized theoretically. However, due to possibility of collision among beacons utilizing the same timeslot, it is preferable to restrict the number of tags within range. In the scenario where there is only one tag reader with 8 hosts, it will utilize 8×3/80=30% broadcast timeslots for each broadcast channel. As the number of tag readers within range is increased, it is advantageous to increase the broadcast interval duration of the broadcast beacon to be longer than 20 ms to maintain 30% or less broadcast timeslot utilization per broadcast channel in order to keep the probability of beacon collision reasonable low, thereby achieving the optimal balance between high tag read speed and low beacon collision rate.

According to an alternative embodiment of the invention, the broadcast timeslot utilization can achieve as high as 60% per broadcast channel without significant beacon collision issues by deploying a tag reader with 16 BLE hosts. The broadcast interval of each host is set to be 20 ms as the optimal configuration which can keep the probability of beacon collision reasonable low, thereby achieving the optimal balance between high tag read speed and low beacon collision rate.

For most typical use cases, it is sufficient to achieve reasonable read speed performance by using a tag reader having 8 hosts, with the broadcast interval of each host set as 20 ms to attain 30% broadcast timeslot utilization per broadcast channel. On the other hand, 60% broadcast timeslot utilization per broadcast channel based on 16 hosts are preferably implemented for scenario where there is a need to achieve the fastest read speed for detecting a significantly large number of tags.

According to one embodiment of the invention, the beacon sequences of a same channel of different host module are related in the time domain such that the first beacon 511 on channel 37 (at the first advertising frequency) within a broadcast period on a host module 510 is followed immediately by the first beacon 514 on channel 37 (also at the same first advertising frequency) within a broadcast period of a subsequent host module 520. In other words, beacons of different hosts on the same advertising channel follow closely one after another.

Figure 5B:
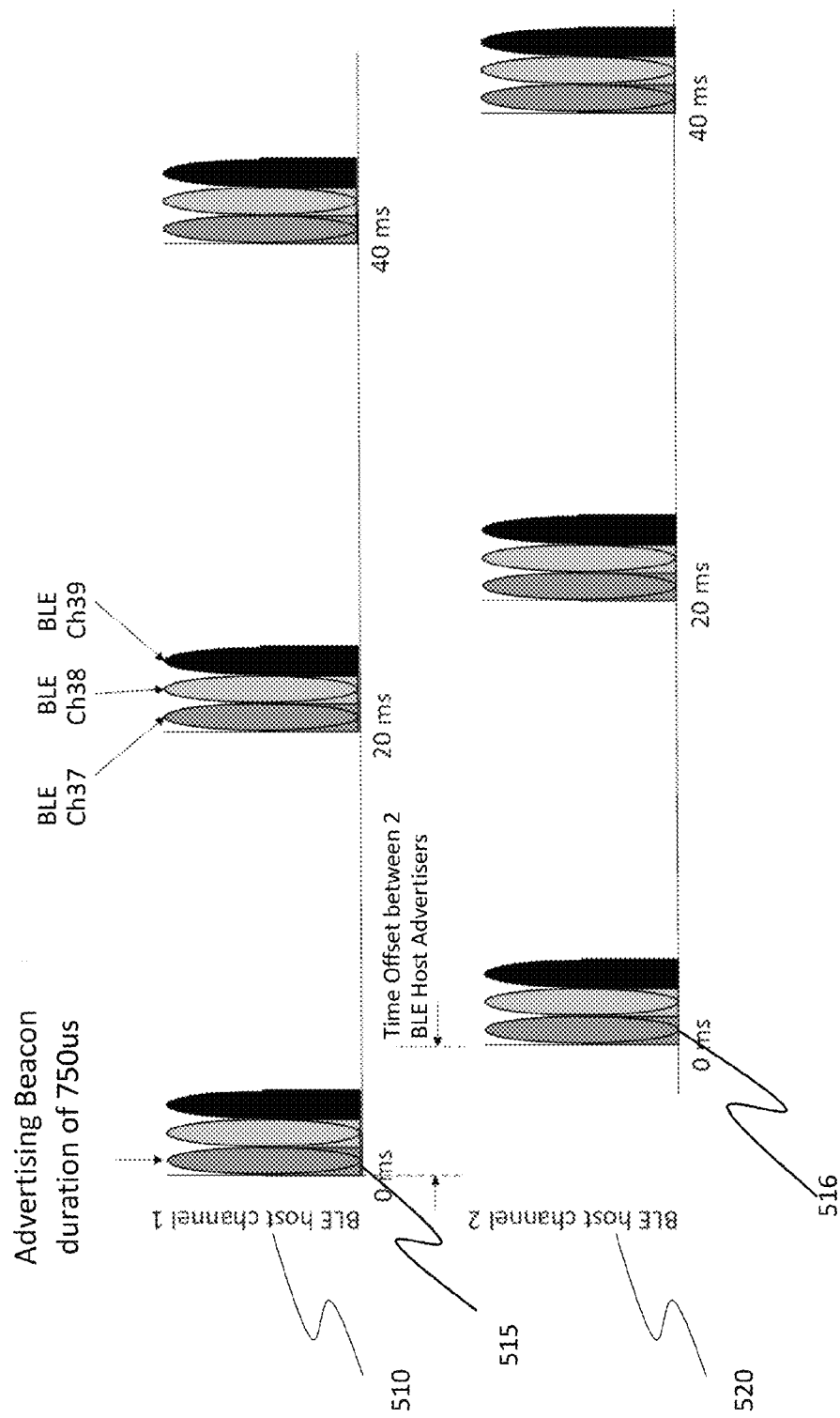
FIG. 5b is a signal diagram illustrating the broadcast beacon duration and interval of a tag reader with multiple hosts, according to an alternative embodiment of the invention.

FIG. 5b is a signal diagram illustrating the broadcast beacon duration and interval of a tag reader with multiple hosts 510, 520, etc., according to an alternative embodiment of the invention. The beacon sequences of a same channel of different host module are related in the time domain such that the first beacon 515 on channel 37 (at the first advertising frequency) on a host module 510 and the first beacon 516 on channel 37 (also at the same first advertising frequency) on a subsequent host module 520 are separated by a predetermined period of time. In other words, beacons of different hosts on the same advertising channel are separated by a predetermined time gap.

Figure 6:
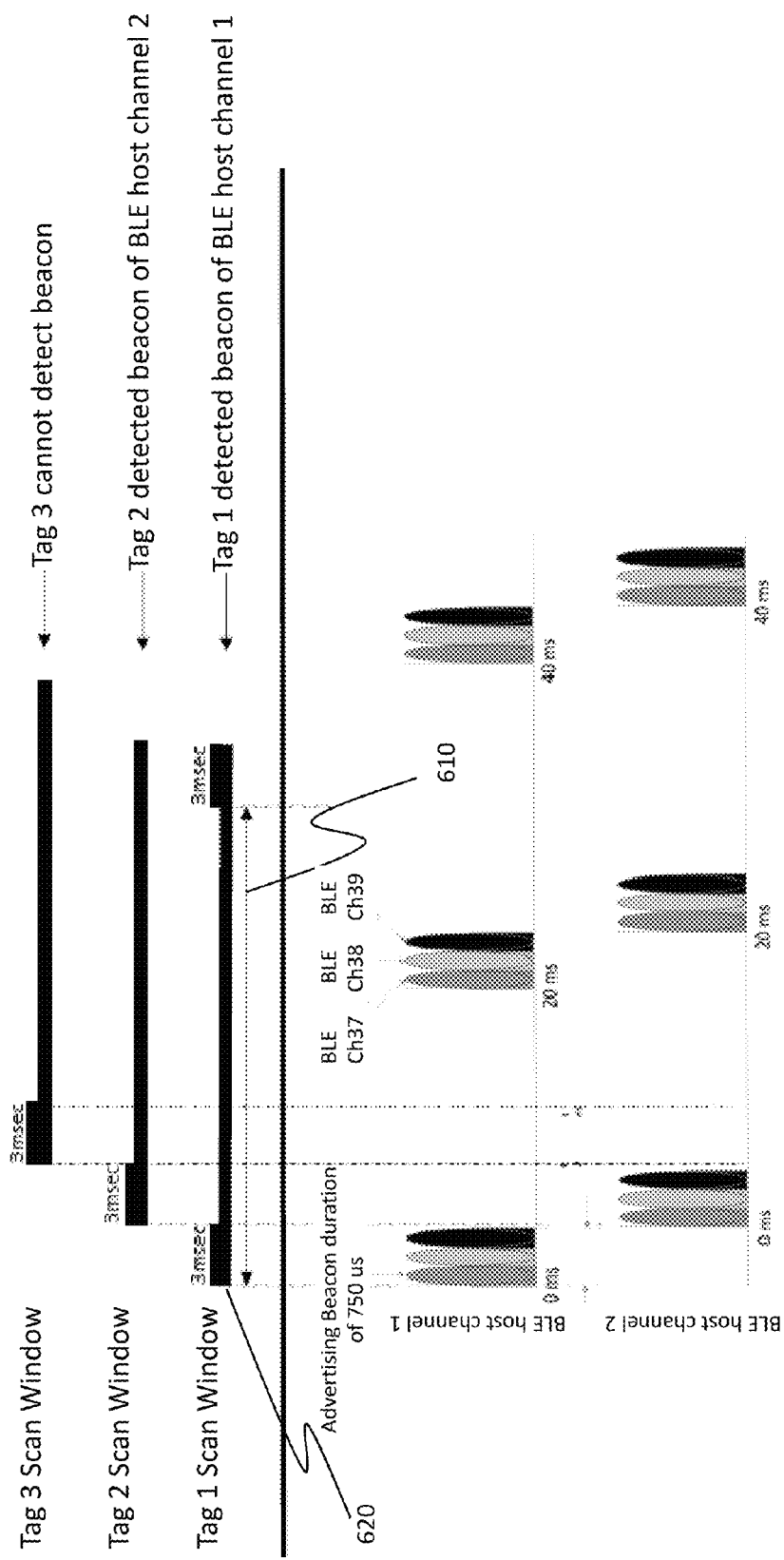
FIG. 6 is a signal diagram illustrating the scan windows of tags during scan phase for detecting broadcast advertising beacons, according to an embodiment of the invention.

FIG. 6 is a signal diagram illustrating the scan windows of tags during scan phase for detecting broadcast advertising beacons, according to an embodiment of the invention. The beacon detection speed is determined by the scan interval 610 and scan window 620 parameters of the tag. The setting of different scan window duration 620 changes the probability of detecting the beacon by the tag. A longer scan window ensures that beacons are detected earlier while a shorter scan window increases the chance of not detecting the beacon as it could scan in a time window that the beacon is not present. On the other hand, longer scan window has a huge impact on power consumption since they relate to the amount of time the radio circuit must be turned on. The scan interval 610 and scan window 620 parameters define how often and for how long a scanner device such as a tag will listen to potential advertising beacon packets. As with advertising interval, those values has a deep impact on power consumption, since they directly relate to the amount of time the radio must be turned on.

One consideration in the system design is to have power saving for Tag (low duty cycle on RF activities) because tag preferably uses small size batteries such as coin cell batteries for convenient attachment to goods. The reader nevertheless can be connected to external power source because it can operate at a fixed location, so power consumption is not a problem for the reader. For this reason, the reader can afford more powerful CPU and higher duty cycle on RF activities. The tag's scan interval 610 and scan window 620 are set to optimize its battery life and meanwhile to leverage the tag reader's aggressive advertising interval (fastest at 20 ms), thereby to increase the speed of tag detection.

According to an embodiment of the invention, one Beacon broadcast duration is approximately 750 µs. Broadcast advertising beacons for channel 37, 38 and 39 are sent consecutively. The total broadcast duration for three beacons is approximately 750 µs×3=2.25 ms. In order to optimize the battery life of the tag, the tag scan window may be set at 3 ms to scan once per every 2-second wake up cycle (scan interval at 2 s). As 3 ms will cover the duration of three broadcast advertising beacons, there is sufficient chance for the tag to detect one of the broadcast beacon of one of the 8 BLE hosts of the tag reader.

There may be cases where the scan window duration of the tag may not coincide with the broadcast advertising beacon timeslots. In such case, the tag will sleep and wake up after 2 seconds to scan for broadcast beacon again. Based on tag reader's advertising broadcast beacon duration of 20 ms per BLE host, 8 BLE host will occupy timeslot duration of 2.25 ms×8=18 ms. The probability of a tag with a scan window of 3 ms to detect the beacon of at least one of the 8 BLE host of the tag reader is quite good especially when there are many tags within range of the tag reader. Once the tag detects a broadcast beacon of the tag reader, it recognizes that tag reader is present. The next step for the tag is to move from scan phase to connection phase, which will be further described in FIG. 8 below.

Figure 7:
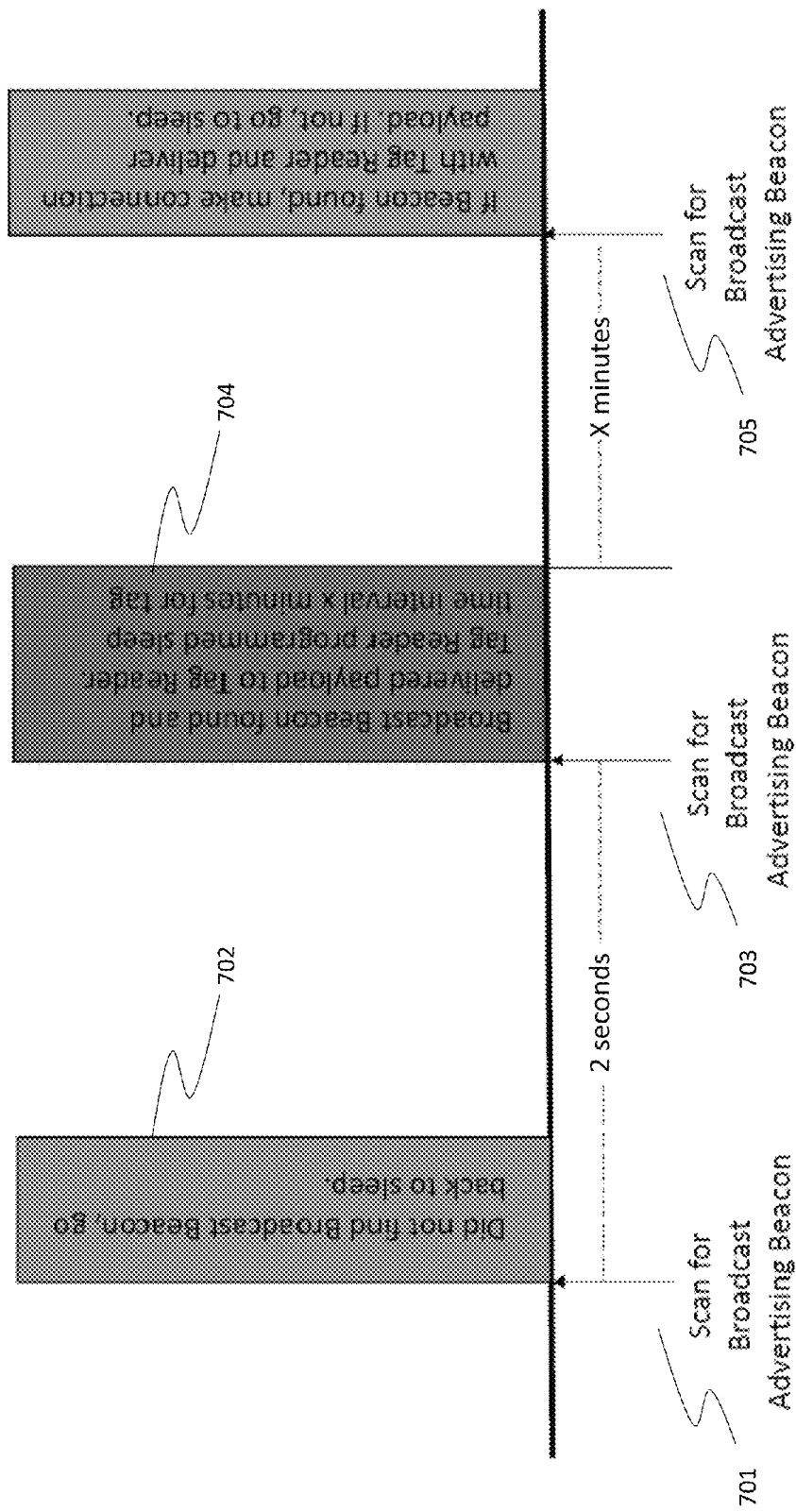
FIG. 7 is a timeline illustrating the wake up cycle taken by a tag in scan phase, according to an embodiment of the invention.

FIG. 7 is a timeline illustrating the wake up cycle taken by a tag in scan phase, according to an embodiment of the invention. A tag needs to be able to detect the tag reader's beacon ID in order to initiate connection with that particular BLE host of the tag reader. In step 701, the tag wakes up periodically to detect the presence of the beacon signal which contains the beacon ID. If no beacon signal is detected, the tag proceeds to step 702 and go back to sleep until the end of the scan interval. During scan phase, only the receiver circuit of tag 300 is turned on for detecting the beacon ID whereas the transmitter of tag 300 is turned off. This is important to ensure the tag conserves its battery life and at the same time opens up application of RFID tag on board flights. On board flights, tag 300 preferably will not detect beacon ID as there are no tag readers present. In such case, the tag will be in sleep phase throughout the flight and will not activate its transmitter circuits to turn on for transmission of identification payload. In an alternative embodiment, where the tag may not have a sleep phase, it is configured to enter scan phase throughout the flight, with the transmitter circuits turned off. Since tag 300 has its transmitter circuit turned off during flight, it complies with FAA regulation and can be used on board flights. For optimization of battery life of the tag, at least one of the following methodologies may be deployed.

According to an embodiment of the invention, the number of tag readers (ratio of readers to the number of tags that need to be read) can be increased to ensure that there are enough BLE hosts for tags to gain access for uploading individual tag payload to the tag reader. The faster the tag delivers its payload, the faster it goes to sleep which preserves battery life. Having more BLE hosts (more tag readers) and less connection retries will improve tag's battery life.

According to an embodiment of the invention, the tag reader has 8 hosts and the broadcast beacon interval of the tag reader is preferably to be programmed with value set by multiplying 20 ms with number of tag readers deployed in order to maintain 30% broadcast timeslot utilization per broadcast channel.

According to an alternative embodiment of the invention, the tag reader contains 16 hosts and the broadcast beacon interval of the tag reader is preferably to be programmed with value set by multiplying 20 ms with number of tag readers deployed in order to maintain 60% broadcast timeslot utilization per broadcast channel.

Setting longer broadcast interval of the advertising packet could reduce the possibility of beacon collision but in the meantime will also reduce the speed at which tags can be found and connected. There needs to be a balance between the number of host channels and advertising interval against the tag detection speed. According to an embodiment of the invention, 20 ms is chosen as the shortest broadcast advertising interval in order to get the fastest possible tag detection speed with reasonably low chance of beacon collision.

According to an alternative embodiment of the invention, the wake up timing for the tag to scan for the tag reader's beacon ID can be adjusted to optimize the battery life of the tag. When using coin cell batteries, the optimal value of wake up interval is 2 seconds to scan for beacon ID. In step 703, the tag wake up from sleep mode and scan for beacon ID. When the tag has discovered the tag reader, it proceeds to step 704, sends the identification payload and enter sleep mode. The wake up interval is programmed to be in multiple of minutes to allow other tags more opportunity to connect with the tag reader. Upon expiry of the programmed sleep duration, the tag wakes up and performs step 705 to scan for broadcast beacon again.

Figure 8:
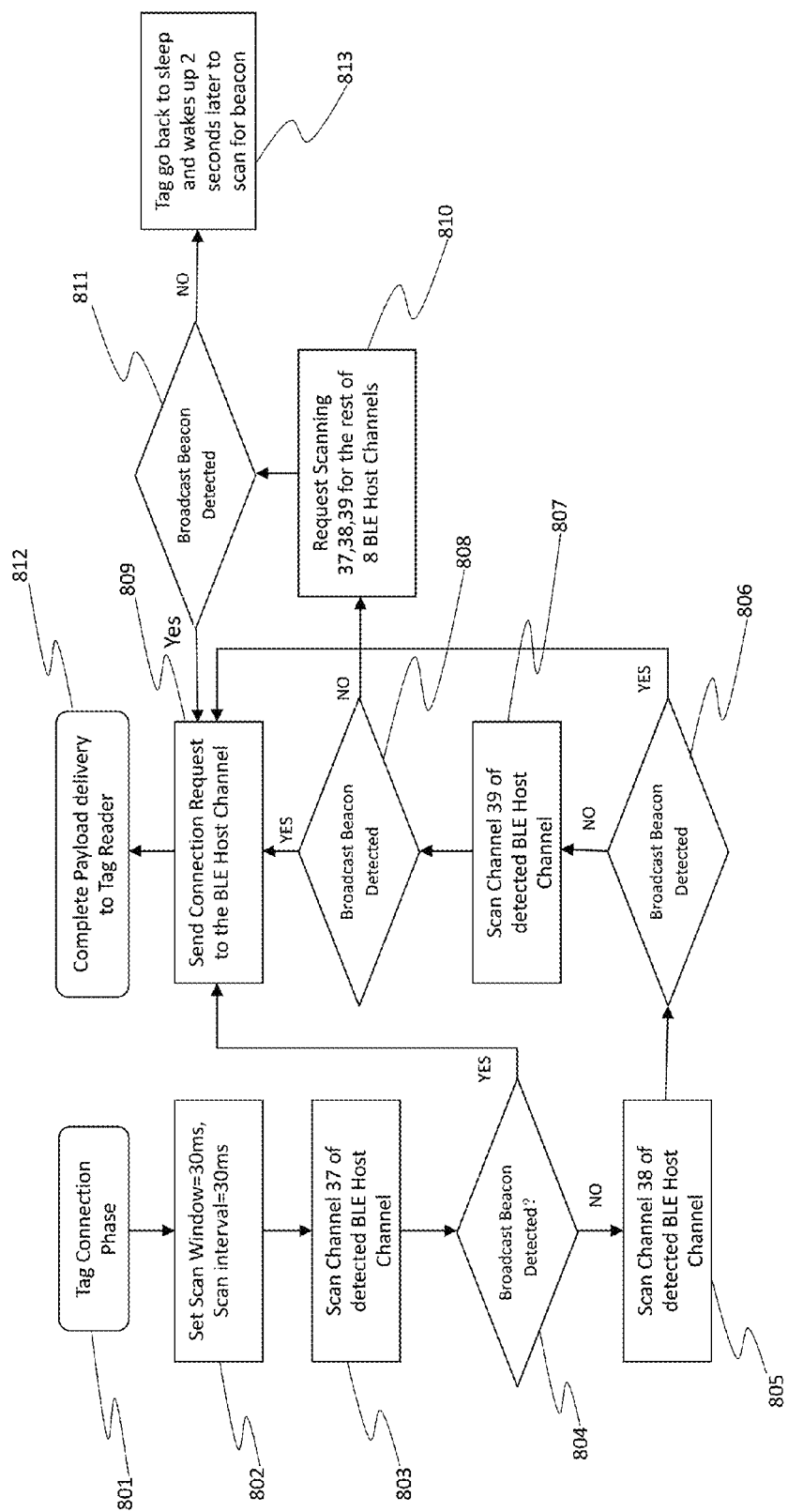
FIG. 8 is a flow chart illustrating steps taken by a tag in connection phase, according to an embodiment of the invention.

FIG. 8 is a flow chart illustrating steps taken by a tag in connection phase, according to an embodiment of the invention. To establish a connection, in step 801 the tag first starts to scan for the tag reader's BLE host that it has detected the beacon. This additional scan step is to ensure that before connection, the host is still available and not occupied by other devices making connection to it.

According to an embodiment of the invention, the scan window and scan interval are both set to 30 ms and the total timeout is 90 ms to allow the tag to complete scanning all three broadcast channels (steps 803-808) of that particular BLE host. At the end of 90 ms timeout, in step 810 the tag will repeat the process for the rest of the 8 BLE host of the tag reader in a random manner. If a beacon is successfully detected, the tag will proceed to step 809 to send connection request to the BLE host, and subsequently complete payload delivery to the tag reader (step 812). If no beacon is successfully detected after trying all 8 hosts of the tag reader (step 811), the tag will proceed to step 813 and go to sleep and wake up after 2 seconds to detect for broadcast beacon again.

According to an embodiment of the invention, setting scan window and scan interval to the same value will allow the BLE tag keep scanning on three advertising channels of the same host. The advertiser (reader) and scanner (tag) may not be on the same channel from the beginning. That is why the setting of total timeout needs to consider three advertising channels interval. According to BLE Specification, a random time shift is added to the advertising packet start timing during each advertising cycle so as to avoid continuous collision of advertising packets between different hosts. According to an embodiment of the invention, instead of setting 20 ms multiplied by 3 as the total timeout, 30 ms multiplied by 3 is used to cater for the time shift. The scanning protocol and scanning state timing are explained in more detail in Bluetooth specification v4.0 Volume 6 section 4.4.3.

According to an alternative embodiment of the invention, the tag can be programmable to sleep for an adjustable sleep interval or to enter turn off state via the control byte in tag reader's acknowledgement packet. When a tag has successfully delivered its identification payload to the tag reader, the tag reader will acknowledge receipt with a control byte being sent to the tag. The control byte has parameters which either sets the wake up interval of the tag or turn off the tag. By setting the longer wake up interval of the tag after it has delivered its identification payload will prevent it from competing with other tags to access the BLE host of the tag reader. The value of tag wake up interval can be determined by the tag reader depending on its defined objectives. Typically, the wake up interval default value is at least 5 minutes. For better management of the tag battery life, the tag reader can also utilizes the tag ID to determine the travel transit timing when the tagged goods are leaving the warehouse holding area and transported by land, sea or air. The tag reader can use the cellular data network or WiFi to query its central server to determine its current location and what the minimum transit time of the tagged goods before it reaches its next warehouse holding area whereby tag readers will be present to sense the tagged goods. When the tagged goods has reached its final destination, tag readers will turn off the tags so that they will not consume power during on its return journey to the originating tag assignment point. In the logistic supply chain, it is estimated that only 15% of the time the tag needs to be actively scanning for tag readers. By controlling the sleep interval and power off sequence of the tag using the tag reader, the battery life of the tags running on coin cell batteries can be stretched to 4-6 years before the need for battery or tag replacement. Hence, the running cost of an active RFID BLE tag system can be very economical for real deployment.

Figure 9:
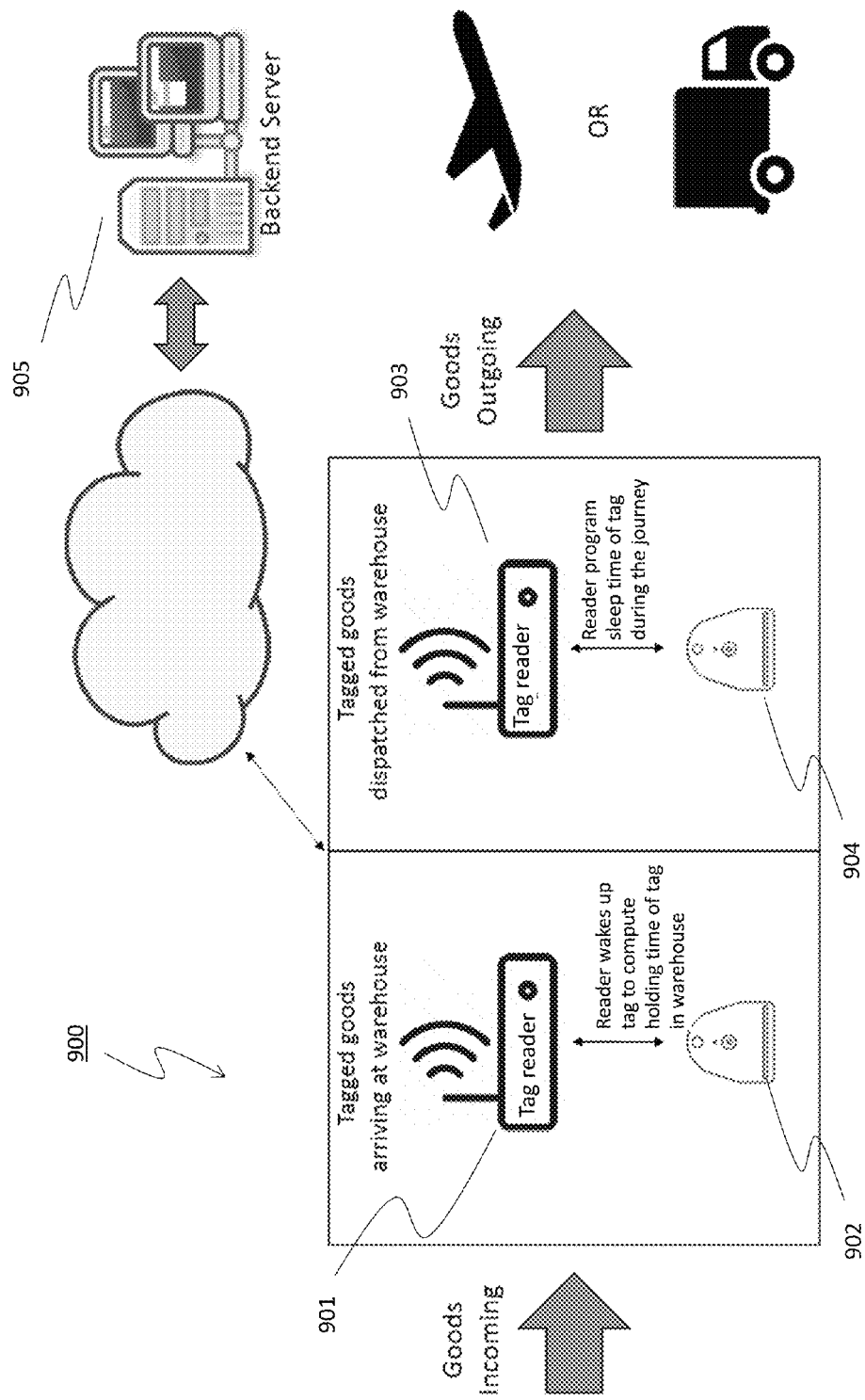
FIG. 9 is a diagram illustrating the application of the logistic system, according to an embodiment of the invention.

FIG. 9 is a diagram illustrating the application of the logistic system 900, according to an embodiment of the invention. Depending on the application of the active RFID system, in one embodiment of the invention, tags 902 can be programmed to wake up at same/longer interval or be turned off. In a further embodiment of the invention, the tag 902 can be programmed to wake up continuously when the active RFID tracking system wishes to detect the holding time/ movement of goods that it is tracking. As the tag readers 901, 903 are connected to a backend system 905 that is able to know the itinerary and schedule of the tagged goods, it will be able to collect information like when the goods was detected for example in an airport holding warehouse and when it was moved to the dispatched warehouse for shipping to another location. At the outgoing cargo station, tag readers 903 can program the tag 904 to sleep for the duration of the flight time or trucking destination so as to conserve the tag's battery life.

When the tagged goods have reached its destination, the tag reader at the arrival cargo area can programme the tag to be turned off in order for the tag to save battery life while being transported back to the goods assignment centre to be turned on again and assign to item for tracking by the system.

According to an alternative embodiment of the invention, the beacon advertising packet transmitted by the tag reader to the tag may further derive Received Signal Strength Indicator (RSSI) with respect to the signal strength of a channel of the tag reader host of the detected beacon signal.

In the scenario where there are thousands of tags surrounding the tag readers, there will be competition for securing connection to the tag reader's 8 BLE hosts. When the tag scans for the tag reader's beacon, it can acquire one Bluetooth address of that particular BLE advertised channel and be able to deduce the rest of the BLE advertised channel by mapping the Bluetooth address accordingly. Together with the RSSI data info available, the tag would know whether this tag reader is far or near to it.

More specifically, the tag reader's RSSI value and Bluetooth LSB fixed addressing can be used to enable the tag to execute random tag reader channel connection in order to have efficient BLE channel utilization of the Tag reader's 8 BLE hosts. When there are a great number of tags surrounding the tag reader, the chances that many tags detecting the beacon of a particular BLE host becomes greater especially when some of the BLE hosts RF transmitter is stronger than other channels. In the event that many tags attempt to connect to the same BLE host, there is a likelihood that many of them will fail and attempt again. This will create channel hogging and the many retries will consume battery life of the tags. To eliminate such "channel hogging" behaviour, the tag will use the pre-assigned Bluetooth address of the tag readers (LSB of BLE hosts fixed from 0-7) to deduce the 8 BLE hosts that are available based on the current Broadcast beacon's Bluetooth address. Subsequently, the tag will also base on the detected beacon's RSSI value to determine whether the tag reader is far or near to the tag.

Using RSSI and Bluetooth address info of the detected beacon, the tag can choose two schemes for securing connection with the tag reader. If RSSI value is good, the distance of tag to reader is close by. That means that the tag can randomly use anyone of the 8 Bluetooth addresses of the tag reader to connect using random channel connection method to reduce channel hogging (tags trying to connect to the same host). In particular, the tag will first use current detected BLE host to connect with. If connection is unsuccessful, it will re-try using a different BLE host based on random hashing again. This goes on until all 8 BLE host has been attempted or the identification payload of the tag has been delivered to the tag reader. This would prevent tags from competing with each other to secure the same channel connection and increase the success rate of connecting to the tag reader.

On the other hand, if RSSI value of tag reader is not good, the other hosts may not be reachable and the tag will only use the current detected BLE host to set up connection and will not retry the rest of the 8 BLE host for connection. This will avoid wasting battery life trying to connect to hosts that are not reachable.

Whilst the invention has been described in connection with various embodiments, it is to be understood that the invention is not limited to these embodiments, and that alterations, modifications, and variations of these embodiments may be carried out by the skilled person without departing from the scope of the invention. For example, the tag reader may be implemented as software arranged to run on a handset or processor configured to execute the software.

The invention claimed is:

1. A method of operating a bi-directional communication system between a plurality of communication devices which comprise at least one communication controller and a plurality of nodes including a first node, the method comprising:
periodically broadcasting a beacon signal from said communication controller at a broadcast interval via a channel of a first host, said beacon signal containing a first address of said communication controller;
periodically scanning said beacon signal on said first host by said first node;
upon detecting of said beacon signal by said first node, transmitting an identification payload from said first node to said communication controller; and
upon receipt of said identification payload by said communication controller; transmitting an acknowledgement signal to said first node;
wherein said acknowledgement signal further contains a command instructing at least one subsequent action to be taken by said first node;
wherein said at least one subsequent action is said first node entering sleep mode.

2. The method of operating a bi-directional communication system according to claim 1, wherein said at least one subsequent action is said first node entering sleep mode for a specified duration.

3. The method of operating a bi-directional communication system according to claim 1, wherein said at least one subsequent action is turning off said first node.

4. The method of operating a bi-directional communication system according to claim 1, wherein said first node enters sleep mode for a first sleep duration after receiving said acknowledgement signal.

5. The method of operating a bi-directional communication system according to claim 4, wherein said first node enters sleep mode for a second sleep duration if said acknowledgement signal is not received for a predetermined period of time after transmitting said identification payload.

6. The method of operating a bi-directional communication system according to claim 5, wherein said first sleep duration is longer than said second sleep duration.

7. The method of operating a bi-directional communication system according to claim 1, wherein said communication controller periodically broadcasts said beacon signal at multiple timeslots via alternative channels at different broadcast frequencies of said first host at the same broadcast interval.

8. The method of operating a bi-directional communication system according to claim 7, wherein said communication controller contains 8 hosts and the timeslots utilized by said communication controller for broadcasting said beacon signals at said 8 hosts amount to 30% or less of the broadcast interval for the broadcast channel.

9. The method of operating a bi-directional communication system according to claim 7, a beacon signal within a broadcast period of said first host is followed immediately by a beacon signal of the same broadcast frequency within a broadcast period of said second host.

10. The method of operating a bi-directional communication system according to claim 7, wherein a beacon signal of said first host and a beacon signal of the same broadcast frequency of said second host are separated by a predetermined period of time.

11. The method of operating a bi-directional communication system according to claim 1, wherein said communication controller periodically broadcasts at least a further beacon signal containing at least one alternative address of said communication controller on a channel of a second host at the same broadcast interval, and wherein the respective broadcast frequencies of the same channel in different hosts are the same.

12. The method of operating a bi-directional communication system according to claim 11, wherein said communication controller contains at least 2 hosts, each host of said hosts periodically broadcasts 3 beacon signals, and wherein said hosts contain different addresses of said communication controller, and wherein the respective broadcast frequencies of the same channel in different hosts are the same.

13. The method of operating a bi-directional communication system according to claim 11, wherein said first node connects immediately to the address of said communication controller as contained in the received beacon signal if the signal strength of the received beacon signal is low, or otherwise, connects to alternative addresses of said communication controller.

14. The method of operating a bi-directional communication system according to claim 13, wherein said beacon signal is configured as limited discoverable mode.

15. The method of operating a bi-directional communication system according to claim 1, wherein said first node upon detecting of said beacon signal, only transmits said identification payload to said communication controller after checking that a beacon signal is present on the same channel at the next broadcast interval.

16. The method of operating a bi-directional communication system according to claim 1, wherein said communication controller is a tag reader and said plurality of nodes are tags.

17. The method of operating a bi-directional communication system according to claim 1, wherein the two-way communication system is Bluetooth low energy system.

* * * * *